Sept. 7, 1937.    C. W. HANSON    2,091,981
METHOD OF AND APPARATUS FOR CARRYING OUT CHEMICAL REACTIONS
Filed May 27, 1935    2 Sheets-Sheet 1
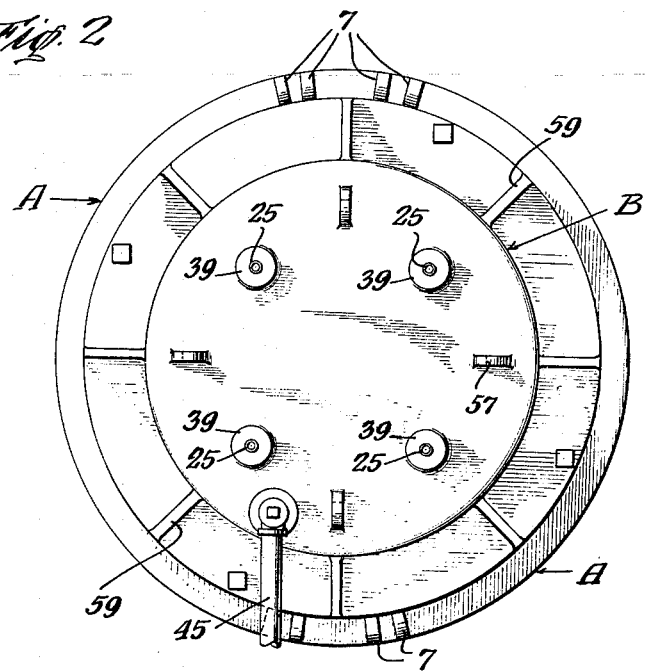
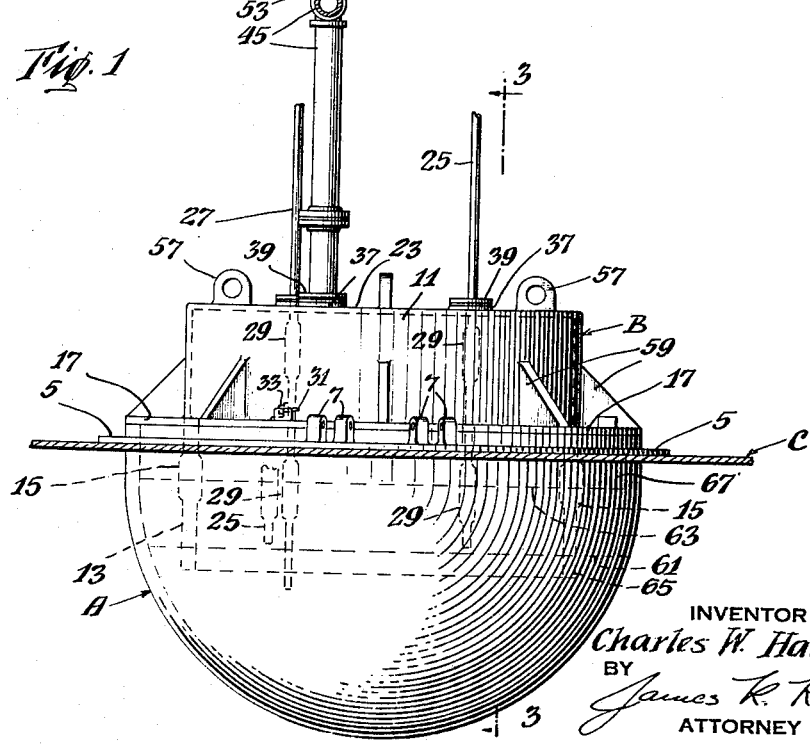
INVENTOR
Charles W. Hanson
BY
James R. Kent
ATTORNEY

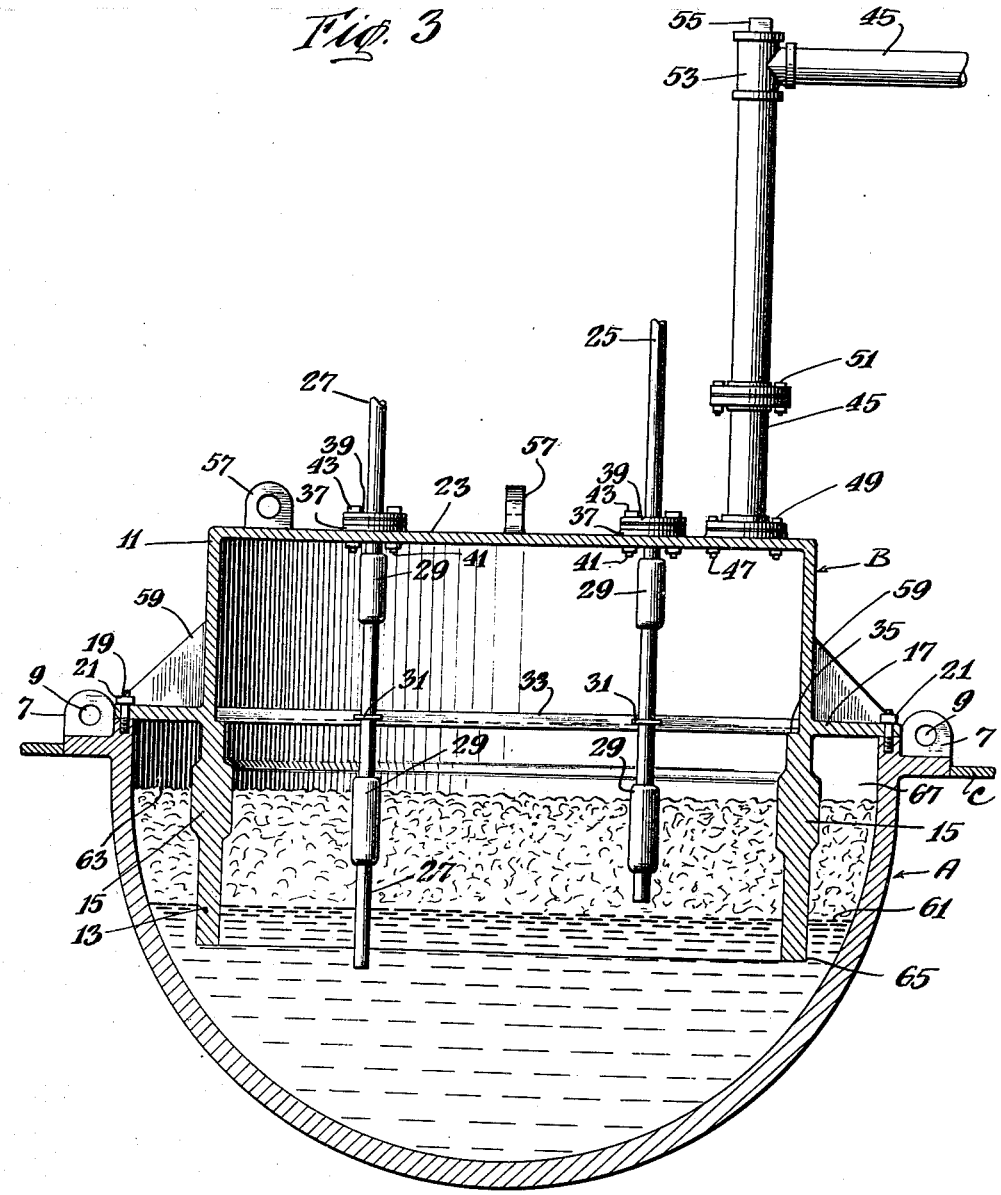

Patented Sept. 7, 1937

2,091,981

UNITED STATES PATENT OFFICE 2,091,981

METHOD OF AND APPARATUS FOR CARRYING OUT CHEMICAL REACTIONS

Charles W. Hanson, Plainfield, N. J.

Application May 27, 1935, Serial No. 23,602

9 Claims. (Cl. 75—78)

The present invention provides an improved apparatus especially adapted for use in metal refining operations which involve the use or production of gaseous or vaporous materials, the invention providing, more specifically, improved means for preventing leakage of such materials during the course of the operations being carried out.

More specifically, the invention provides an improved seal for preventing the escape of gases from metallurgical or chemical apparatus; and the invention will be described particularly in connection with its use in the production of stannic chloride, although its use is not restricted at all to this particular application, as will be obvious.

The production of stannic chloride (tin tetrachloride) by the action of chlorine on metallic tin is well known, as are also the volatile and fuming qualities of stannic chloride, the vapors of which possess a high rate of diffusion, which renders them difficult to control.

The production of stannic chloride as a valuable by-product is applied in accordance with the present invention, specifically to the removal of tin from tin-containing lead or alloys, by melting the metal to be detinned, under a slag of lead chloride, and passing chlorine into the slag layer.

This reaction depends upon the facts, first, that tin in the presence of lead chloride acts as a reducer for the latter to form stannous chloride in accordance with the reaction.

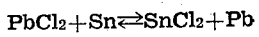

and, second, that the resulting stannous chloride is converted into stannic chloride by chlorine gas:

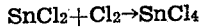

The stannic chloride, being volatile at the temperatures employed, passes out from the system.

The first of these reactions is a simple equilibrium, as indicated above, and the equilibrium point favors a predominance of lead over tin, since the heat of formation of lead chloride is somewhat higher than that of stannous chloride. Therefore, when it is attempted to carry out the above reaction, only a small amount of tin will react with lead chloride to form stannous chloride; if however, the tin in the form of chloride be continuously removed from the reaction system, as takes place upon its conversion into stannic chloride, the reduction of the lead chloride will proceed to completion. As the stannic chloride volatilizes from the reaction system, additional tin is removed by reaction with the lead chloride, and there has been obtained, in effect, the selective chloridization of the tin from the lead.

In carrying out the above indicated reaction, the tin-containing lead or alloy is melted, usually in an iron kettle, and lead chloride is charged onto the surface of the bath, the lead chloride being preferably mixed with suitable salts which will lower the melting point of the lead chloride, while not entering the reaction. Alkali and alkaline earth chlorides, such as sodium chloride, potassium chloride, and calcium chloride, have been employed, and many others may be used likewise.

The result is that upon the molten alloy bath there is floating a layer of molten slag comprising, principally, lead chloride. A layer of such slag of considerable depth is allowed to form, there being a partial interaction of the tin in the alloy bath with the lead chloride of the slag in accordance with the first equation above. In order to remove the resulting stannous chloride, thereby enabling the reaction to run to completion, chlorine gas is passed through the molten slag layer, care being taken to avoid contact between the chlorine and the alloy bath, the latter being stirred vigorously, however, to promote contact between the metal bath and the molten salt layer of slag.

During this operation, stannic chloride is evolved freely from the slag, and may be condensed and recovered. By maintaining the chlorine out of contact with the molten metal bath, formation of lead chloride from the lead is avoided, the lead chloride in the slag being reduced to metallic lead, which passes into the metal bath, so that in continued operation it may be necessary to replenish the lead chloride content of the slag from time to time.

It has been pointed out above that stannic chloride is evolved freely during the operation of the process, and in carrying out the above described operations, it has been found to be difficult to control the stannic chloride so as to prevent leakage thereof into the atmosphere surrounding the apparatus, the contact of the stannic chloride vapors with air producing copious evolution of dense white fumes the presence of which seriously contaminates the air surrounding the installation, as well as resulting in the loss of a valuable material.

In view of the gaseous nature of the reagent chlorine and the gaseous nature of the stannic chloride evolved, a covered kettle is used for the reaction, and considerable difficulty has been experienced in making a gas-tight fit between the cover and kettle, which difficulty has been augmented by the fact that slight superatmospheric pressure tends to build up under the hood and in the kettle, notwithstanding the fact that the apparatus train finally opens to the air, this pressure being sufficient to expel vigorously the gases from the hood and kettle through any leaks which may be present; and various means have been tried in order to prevent such gas leakage.

The present invention provides an improved seal for the reaction kettle, this seal being in the nature of a hood which covers the kettle and extends for a substantial distance beneath the surface of the metal in the kettle. The chlorine is introduced within this hood and the stannic chloride collects in the hood and is withdrawn from the interior thereof, the metal in the kettle sealing the hood and preventing, through hydrostatic pressure, the escape of gases from beneath the edge of the hood, thereby preventing the gases from entering the space between the hood and the kettle proper.

It will be apparent that this so-called "hood" is, functionally, a sealing bell or cone which dips beneath the metal level in the kettle and into which the gaseous reactants are passed. The gaseous reaction products rise within the hood, and tend to collect in the confined space between the top of the hood and the charge in the kettle, but are enabled to pass freely from this space by a suitable conduit which may lead to a suitable condenser for condensing these vapors.

The invention will be more readily understood by reference to the accompanying drawings, which illustrate one form of the apparatus, it being understood of course that various departures from this illustrated form may be made without departing from the concept of the invention, the features of novelty being set forth in the appended claims. In the drawings, Fig. 1 is an elevation of an assembly of a kettle provided with a convenient form of the improved seal of the present invention.

Fig. 2 is a plan view of the apparatus of Fig. 1.

Fig. 3 is a sectional elevation of the apparatus, taken on the line 3—3 of Fig. 1, looking in the direction of the arrows.

Referring more particularly to the drawings, A represents a container, such as a cast iron kettle, adapted to contain a suitable quantity of material to be treated, this kettle being provided with a hood B, which forms a cover for the kettle. The kettle is shown as being mounted in a floor C and supported thereby, and the kettle is arranged to be heated in any desired well understood manner, as by an oil or gas burner of usual type, not shown.

The kettle A and hood B are made preferably of cast iron, in order to resist more effectively the corrosive action of the reactants and products of the reaction. It will be noted that the kettle is provided with a flange 5, which supports the kettle on the floor C, and the kettle is provided with a suitable number of lifting lugs 7, each having an eye 9 for the insertion of any suitable lifting instrumentalities, not shown, for lifting and replacing the kettle in position.

The hood B is cast as an integral structure and comprises the upper portion 11 and lower portion 13, this lower portion extending well into the kettle A and since the lower portion 13 is subjected to more active corrosion because of its contact with the charge in the kettle, than is the upper portion 11, it is desirably cast thicker than the upper portion, and where the portion 13 is designed to be subjected to most active corrosion, it is cast with an extra thick annular portion 15, which extends peripherally around the lower part 13. The hood B is provided also with an annular flange 17, which is adapted to rest on the rim of the kettle A; and the flange 17 and kettle rim may be provided with a suitable number of holes adapted to be brought into registry for receiving threaded bolts 19, adapted to receive nuts 21, the tightening of which nuts will clamp the hood B to the kettle. In practice, however, these bolts 19 may be omitted, since the weight of the hood B is sufficient to maintain the hood in position relative to the kettle.

The top 23 of the hood B is provided with a plurality of holes for the passage of a suitable number of pipes 25, for the introduction of reagent, such as chlorine, and also at least one pipe 27 for the introduction of an inert gas, by means of which a suitable agitation of the kettle charge may be obtained. These pipes are made of any convenient corrosion-resisting material, such as, for example, chrome-nickel steel, and the sections of the pipes may be connected by connectors 29. The pipes may be supported in place by U-bolts 31 secured in suitable bars, one of which is shown at 33, which extend across the interior of the hood B and which are mounted on the flange 35 which is formed by the thicker walls of the lower section 13 of the hood B.

Around each of the pipe holes through the top 23 of the hood is a smooth collar 37 each of which forms a seat for a flange plate 39 mounted on the respective pipes, these flange plates being clamped in position by threaded bolts 41 and nuts 43 operating on the bolts. Between the flange plates 39 and their seats 37 are placed suitable gaskets, so that when the nuts 43 are tightened, a gas-tight fit will be provided, it being understood of course that the flange plates 39 are fitted tightly on their respective pipes so that there will be no leakage therebetween.

In a manner similar to that just described, an outlet conduit 45 is mounted on the top 23 of the hood B, this conduit 45 being secured in gas-tight relation to the top 23 by bolts 47 and nuts 49 operating thereon. The sections of the conduit 45 are bolted together as shown at 51, and an elbow union 53 is provided wherever the conduit 45 may change its direction. Each union 53 is provided with a removable plug 55 by which access to the interior of the conduit 45 may be had.

Lifting lugs 57 are provided on the hood B by means of which lugs the hood B may be manipulated as desired by suitable mechanism, not shown. Also, the hood B is provided with a plurality of ribs 59 cast integral with the upper section 11 of the hood and with the flange 17, these ribs reinforcing the hood and preventing cracking thereof.

Where tin-containing metal is to be detinned, the metal is brought up for instance to the level of the line 61 in the kettle when the metal is molten, this level being well above the edge of the lower section 13 of the sealing hood B, which is thereby immersed, when in service, in the metal being treated, and the lead chloride slag is brought up to the level of the line 63, which contacts with the thick ring 15, this ring, because of its extra thickness, better resisting the corrosive action of the lead chloride slag. Chlorine pipes 25 therefore extend beneath the level of the slag, but not into the metal bath, while the pipe 27 enters the metal bath. Chlorine entering pipes 25 produces a copious evolution of stannic chloride from the slag, while nitrogen, entering through pipe 27 agitates the metal bath and brings it into intimate contact with the slag. The stannic chloride evolved passes to a condenser not shown by way of the conduit 45. It will be understood also, of course, that the chlorine and nitrogen will be supplied from suitable sources, not shown.

The metal bath seals the hood B, as previously mentioned, and the hydrostatic pressure of the metal bath efficiently prevents leakage of gas from beneath the edge 65 of the sealing hood, and thence into space 67 between the hood and the kettle.

Prior to the adoption of the sealing hood or bell as herein described, it was found to be very difficult, if not impossible, to prevent gas leakage between the cover and the rim of the kettle, notwithstanding the attempted uses of different forms of seals, some of which were relatively intricate in the details of their construction, but none of which, however, completely prevented leakage of the gases from the kettle. This result is accomplished, however, completely and simply by the present construction.

What is claimed is:

1. Apparatus for carrying out chemical reactions in which at least one gaseous reactant is employed and at least one gaseous product is formed, comprising the combination with a kettle adapted to contain material to be reacted upon, a separable hood forming a cover for the kettle and extending into the kettle to beneath the level of the said material, the hood being adapted to be lifted from the kettle and having its portion, subjected to contact with the material, of thicker walls than its portion out of contact with the said material, the said hood being sealed by the said material, means for admitting a gaseous reactant into reactive contact with the said material within the hood, and means for withdrawing gaseous reaction products from the hood, escape of gas from beneath the hood being prevented by hydrostatic pressure of the said material which seals the hood.

2. Apparatus for refining metals, comprising the combination with a receptacle adapted to contain the metals to be refined, of a separable hood forming a cover for the receptacle, the hood having a relatively thin-walled upper portion and a relatively thick-walled lower portion, the said lower portion being adapted to extend into a charge in the receptacle, comprising the metals to be refined, instrumentalities for detachably securing the hood to the receptacle, means for introducing a gaseous reagent into the charge within the hood, and means for withdrawing reaction products from the hood, the said charge sealing the hood and preventing, by hydrostatic pressure, escape of gases from beneath the hood.

3. Apparatus for refining metals, comprising the combination with a receptacle adapted to contain a charge of materials comprising the metals to be refined and a layer of reactive slag on the metals, of a hood adapted to be inserted into the receptacle and charge so that the charge seals the said hood, pipes extending into the hood to the interior thereof and opening into the layer of slag on the metal to be refined and within the confines of the hood, thereby enabling reactants to be passed into the slag, and additional means for effecting agitation of the metal for maintaining the metal in reactive engagement with the slag, the said hood preventing escape of gases from the receptacle into the surrounding atmosphere.

4. Apparatus for refining metals, comprising the combination with a kettle adapted to contain a charge comprising metals to be refined, of a hood adapted to be immersed in the charge, pipes leading into the hood for conducting reactive gases to the charge, flange seats on the hood, flange plates on the pipes adapted to be received on the seats and to be secured in gas-tight relation for supporting the pipes in position, and supplemental supporting means for the pipes within the hood, the said means comprising bars extending across the interior of the hood and clamping bolts for clamping the pipes to the bars.

5. Apparatus for introducing chlorine into a molten bath of tin-containing metal for the removal of tin therefrom which comprises a cylinder closed at one end and open at the other and adapted to be inverted in a receptacle containing a molten bath of the metal to be detinned, so that the open end of the cylinder dips into the molten metal in the receptacle and is sealed by the metal, the cylinder thereby forming a hood for the receptacle, a flange extending around the cylinder and integral therewith for supporting the cylinder in the receptacle, the flange, together with the cylinder, forming a complete cover for the receptacle, inlet pipes for chlorine extending through the closed end of the cylinder and means in the cylinder for securing the pipes so that at least one of the pipes will be positioned so as to dip into the body of molten metal in the receptacle while the remaining pipes are held to dip into a layer of slag floating on the said metal whereby stannic chloride will be evolved only on the interior of the cylinder, means for sealing the inlet pipes to prevent escape of stannic chloride, and an eduction pipe mounted on the cylinder for leading stannic chloride vapors from the said cylinder.

6. In the art of detinning tin-containing lead by introducing chlorine gas into a molten bath thereof contained in a suitable receptacle, the process which comprises preparing a charge in the receptacle by forming on the metal bath a molten layer of lead chloride slag, supporting in the receptacle a hollow vessel resistant to chlorine corrosion and having a closed end and an open end so that the open end of the vessel dips below the layer of lead chloride slag into the metal therebeneath, the vessel being thereby sealed by the molten metal, the hollow vessel thereby forming a hood for the said receptacle, providing the hood with intake pipes for chlorine in gas-tight relation with the hood extending at least one of the pipes through the slag layer into the molten metal beneath the slag, while positioning the remaining pipes to open into the slag, passing chlorine gas through the pipes into the slag and evolving stannic chloride from the charge solely within the confines of the hood, and leading the stannic chloride from the hood as it is evolved from the charge.

7. In the art of detinning tin-containing lead by introducing chlorine gas into a molten bath of the lead contained in a suitable receptacle, the process which comprises preparing a charge in the receptacle by forming on the metal bath a molten layer of lead chloride slag, supporting in the receptacle a hollow vessel resistant to chlorine corrosion and having a closed end and an open end so that the open end of the vessel dips below the layer of lead chloride slag into the metal therebeneath, the vessel being thereby sealed by the molten metal, the hollow vessel forming a hood for the said receptacle, providing the hood with intake pipes for chlorine in gas-tight relation with the hood, extending at least one of the pipes through the slag layer into the molten metal beneath the slag while positioning the remaining pipes to open into the slag, passing chlorine gas continuously through the pipes opening into the slag and passing an inert gas through the pipe entering the metal bath to agitate the bath for maintaining the lead chloride content of the slag, and evolving stannic chloride from the slag solely within the confines of the hood while leading the stannic chloride from the hood as it is evolved from the charge.

8. In the art of detinning tin-containing lead by introducing chlorine gas into a molten bath of the lead to be detinned contained in a suitable kettle, the process which comprises forming a molten bath of the said lead in the kettle, overlying the said bath with a layer of slag containing substantial amounts of lead chloride, together with stannous chloride, supporting in the kettle a hollow vessel having a closed end and an open end, so that the open end of the vessel dips below the molten bath of metal to be detinned, and is sealed thereby to form a hood for the kettle, providing the hood with intake pipes for chlorine in gas-tight relation with the hood and in reactive contact with the molten bath, passing chlorine gas through the pipes into only the slag layer on the bath, evolving stannic chloride from the bath and entirely within the confines of the hood while maintaining the open end thereof sealed by the metal of the bath, leading the stannic chloride from the hood as it is evolved from the bath, and reactively contacting the bath and slag to replenish the lead chloride content of the slag.

9. In the art of detinning tin-containing lead by introducing chlorine gas into a molten bath of the lead to be detinned in a suitable kettle, the process which comprises forming a molten bath of the said lead in the said kettle, overlying the said bath with a layer of slag containing substantial amounts of lead chloride, together with stannous chloride, supporting in the kettle a hollow vessel having a closed end and an open end, so that the open end of the vessel dips below the molten bath of metal to be detinned, and is sealed thereby to form a hood for the kettle, providing the hood with intake pipes for chlorine in gas-tight relation with the hood and in reactive contact with the molten bath, passing chlorine gas through the pipes into only the slag layer on the bath, evolving stannic chloride from the bath and entirely within the confines of the hood while maintaining the open end thereof sealed by the metal of the bath, leading the stannic chloride from the hood as it is evolved from the bath, and maintaining in the slag a reactive content of lead chloride for the bath.

CHARLES W. HANSON.